US010019247B2

(12) United States Patent
Bourke

(10) Patent No.: US 10,019,247 B2
(45) Date of Patent: *Jul. 10, 2018

(54) SYSTEMS AND METHODS FOR APPLICATION INSTALLATION PLATFORMS

(71) Applicant: SWEETLABS, INC., San Diego, CA (US)

(72) Inventor: Adrian Bourke, San Diego, CA (US)

(73) Assignee: SweetLabs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,095

(22) Filed: May 15, 2015

(65) Prior Publication Data
US 2015/0331685 A1 Nov. 19, 2015

Related U.S. Application Data

(60) Provisional application No. 61/994,033, filed on May 15, 2014.

(51) Int. Cl.
G06F 8/61 (2018.01)
(52) U.S. Cl.
CPC .................................... G06F 8/61 (2013.01)
(58) Field of Classification Search
None
See application file for complete search history.

(56) References Cited

U.S. PATENT DOCUMENTS 5,021,949 A 6/1991 Morten et al.
5,548,704 A 8/1996 Steiner et al.
(Continued)

FOREIGN PATENT DOCUMENTS

CN 1322325 A 11/2001
JP 2004185083 A 7/2004
(Continued)

OTHER PUBLICATIONS

International Preliminary Report on Patentability for International Application PCT/US2014/072707, Report issued Jul. 5, 2016, dated Jul. 14, 2016, 4 Pgs.
(Continued)

Primary Examiner — Isaac T Tecklu
(74) Attorney, Agent, or Firm — KPPB LLP

(57) ABSTRACT

Systems and methods for providing an application marketplace configured to install applications outside of an application store provided by the entity providing the operating system of a computing device in accordance with embodiments of the invention are illustrated. In one embodiment, a computing device includes a processor and a memory connected to the processor and storing an application installation application, wherein the application installation application directs the processor to obtain target information including data descriptive of the computing device, transmit a request for a set of recommended applications, where the request includes the target information, obtain recommended application data identifying at least one installation package targeted to the computing device based on the target information, and install the recommended application data on the computing device. In an additional embodiment, the recommended application data is signed using an OEM key.

8 Claims, 10 Drawing Sheets

(56) References Cited

U.S. PATENT DOCUMENTS

| | | |
|---|---|---|
| 5,848,396 A | 12/1998 | Gerace |
| 5,916,310 A | 6/1999 | Mccain |
| 5,987,471 A | 11/1999 | Bodine et al. |
| 6,018,343 A | 1/2000 | Wang et al. |
| 6,023,698 A | 2/2000 | Lavey et al. |
| 6,094,671 A | 7/2000 | Chase et al. |
| 6,098,108 A | 8/2000 | Sridhar et al. |
| 6,115,039 A | 9/2000 | Karren et al. |
| 6,182,141 B1 | 1/2001 | Blum et al. |
| 6,216,141 B1 | 4/2001 | Straub et al. |
| 6,233,609 B1 | 5/2001 | Mittal |
| 6,282,567 B1 | 8/2001 | Finch, II et al. |
| 6,327,628 B1 | 12/2001 | Anuff et al. |
| 6,363,409 B1 | 3/2002 | Hart et al. |
| 6,456,307 B1 | 9/2002 | Bates et al. |
| 6,697,838 B1 | 2/2004 | Jakobson |
| 6,718,516 B1 | 4/2004 | Claussen et al. |
| 6,810,410 B1 | 10/2004 | Durham |
| 6,909,992 B2 | 6/2005 | Ashley |
| 6,981,212 B1 | 12/2005 | Claussen |
| 6,992,589 B2 | 1/2006 | Marsh |
| 7,051,288 B2 | 5/2006 | Bennett et al. |
| 7,207,000 B1 | 4/2007 | Shen et al. |
| 7,272,786 B1 | 9/2007 | McCullough |
| 7,401,325 B2 | 7/2008 | Backhouse et al. |
| 7,614,018 B1 | 11/2009 | Ohazama et al. |
| 7,636,683 B1 | 12/2009 | Mills et al. |
| 7,681,134 B1 | 3/2010 | Grechishkin et al. |
| 7,734,583 B2 | 6/2010 | Vitanov et al. |
| 7,925,988 B2 | 4/2011 | Abernethy, Jr. et al. |
| 7,950,026 B1 | 5/2011 | Urbach |
| 7,996,785 B2 | 8/2011 | Neil |
| 8,046,672 B2 | 10/2011 | Hegde et al. |
| 8,176,321 B1 | 5/2012 | Perry et al. |
| 8,181,254 B1 | 5/2012 | Kay et al. |
| 8,209,598 B1 | 6/2012 | Pandey |
| 8,260,845 B1 | 9/2012 | Colton et al. |
| 8,296,643 B1 | 10/2012 | Vasilik |
| 8,296,684 B2 | 10/2012 | Duarte et al. |
| 8,335,817 B1 | 12/2012 | Dayan |
| 8,346,222 B2 | 1/2013 | Zubas et al. |
| 8,429,546 B2 | 4/2013 | Hilerio et al. |
| 8,434,135 B2 | 4/2013 | Hilerio et al. |
| 8,453,065 B2 | 5/2013 | Chaudhrl et al. |
| 8,458,612 B2 | 6/2013 | Chatterjee et al. |
| 8,555,155 B2 | 10/2013 | Harrison et al. |
| 8,566,697 B2 | 10/2013 | Meredith et al. |
| 8,613,070 B1 * | 12/2013 | Borzycki et al. ............ 726/8 |
| 8,756,488 B2 | 6/2014 | Meredith et al. |
| 8,775,275 B1 | 7/2014 | Pope |
| 8,775,917 B2 | 7/2014 | Bourke et al. |
| 8,775,925 B2 | 7/2014 | Bourke et al. |
| 8,782,033 B2 | 7/2014 | Jiang et al. |
| 8,788,955 B2 | 7/2014 | Quine |
| 8,799,771 B2 | 8/2014 | Bourke et al. |
| 8,806,333 B2 | 8/2014 | Bourke et al. |
| 8,900,054 B2 | 12/2014 | Patel |
| 8,954,989 B1 | 2/2015 | Paul et al. |
| 9,021,469 B2 | 4/2015 | Posey et al. |
| 9,069,735 B2 | 6/2015 | Bourke et al. |
| 9,081,757 B2 | 7/2015 | Bourke et al. |
| 9,141,266 B2 | 9/2015 | Mccormick et al. |
| 9,235,803 B2 | 1/2016 | Claux et al. |
| 9,268,466 B2 | 2/2016 | Momchilov et al. |
| 9,547,725 B2 | 1/2017 | Chu et al. |
| 9,749,440 B2 | 8/2017 | Bourke |
| 2001/0047394 A1 | 11/2001 | Kloba et al. |
| 2002/0129064 A1 | 9/2002 | Guthrie |
| 2004/0019683 A1 | 1/2004 | Lee et al. |
| 2004/0081310 A1 | 4/2004 | Lueckhoff |
| 2004/0177327 A1 | 9/2004 | Kieffer |
| 2004/0205531 A1 | 10/2004 | Innes |
| 2004/0220926 A1 | 11/2004 | Lamkin et al. |
| 2004/0221170 A1 | 11/2004 | Colvin et al. |
| 2004/0268225 A1 | 12/2004 | Walsh et al. |
| 2005/0005234 A1 | 1/2005 | Chen |
| 2005/0097522 A1 | 5/2005 | Backhouse et al. |
| 2005/0102374 A1 | 5/2005 | Moragne et al. |
| 2005/0108678 A1 | 5/2005 | Goodwin et al. |
| 2005/0210412 A1 | 9/2005 | Matthews |
| 2005/0223086 A1 | 10/2005 | Raverdy et al. |
| 2006/0005187 A1 | 1/2006 | Neil |
| 2006/0026438 A1 | 2/2006 | Stern |
| 2006/0059422 A1 | 3/2006 | Wu et al. |
| 2006/0161631 A1 | 7/2006 | Lira |
| 2006/0224989 A1 | 10/2006 | Pettiross et al. |
| 2006/0265280 A1 | 11/2006 | Nakada et al. |
| 2007/0050777 A1 | 3/2007 | Hutchinson et al. |
| 2007/0061700 A1 | 3/2007 | Kothari et al. |
| 2007/0083356 A1 | 4/2007 | Brunet et al. |
| 2007/0244919 A1 | 10/2007 | Wells et al. |
| 2007/0255576 A1 | 11/2007 | Patterson |
| 2007/0255814 A1 | 11/2007 | Green et al. |
| 2007/0277109 A1 | 11/2007 | Chen et al. |
| 2007/0300068 A1 * | 12/2007 | Rudelic ............. G06F 21/572 |
| | | 713/176 |
| 2008/0021696 A1 | 1/2008 | Bartelt et al. |
| 2008/0040226 A1 | 2/2008 | Roker |
| 2008/0082565 A1 | 4/2008 | Chang et al. |
| 2008/0108333 A1 | 5/2008 | Jemison et al. |
| 2008/0120129 A1 | 5/2008 | Seubert et al. |
| 2008/0140529 A1 | 6/2008 | Agarwal et al. |
| 2008/0154718 A1 | 6/2008 | Flake et al. |
| 2008/0172487 A1 | 7/2008 | Brunet et al. |
| 2008/0172736 A1 | 7/2008 | Barr et al. |
| 2008/0208589 A1 | 8/2008 | Cross et al. |
| 2008/0256636 A1 | 10/2008 | Gassoway |
| 2009/0019371 A1 | 1/2009 | Audet |
| 2009/0019436 A1 | 1/2009 | Hartz et al. |
| 2009/0037452 A1 | 2/2009 | Baitalmal et al. |
| 2009/0037492 A1 | 2/2009 | Baitalmal et al. |
| 2009/0070228 A1 | 3/2009 | Ronen |
| 2009/0077174 A1 | 3/2009 | Janssen et al. |
| 2009/0125833 A1 | 5/2009 | Abernethy, Jr. et al. |
| 2009/0132556 A1 | 5/2009 | Gupta et al. |
| 2009/0171974 A1 | 7/2009 | Arthursson et al. |
| 2009/0171993 A1 | 7/2009 | Arthursson |
| 2009/0187928 A1 | 7/2009 | Mark |
| 2009/0217179 A1 | 8/2009 | Mons et al. |
| 2009/0249188 A1 | 10/2009 | Dube et al. |
| 2009/0249238 A1 | 10/2009 | Chudy et al. |
| 2009/0271394 A1 | 10/2009 | Allen et al. |
| 2009/0280907 A1 | 11/2009 | Larsen |
| 2009/0282333 A1 | 11/2009 | Olsen et al. |
| 2010/0017701 A1 | 1/2010 | Bargeron |
| 2010/0023884 A1 | 1/2010 | Brichford et al. |
| 2010/0054128 A1 | 3/2010 | O'Hern |
| 2010/0094878 A1 | 4/2010 | Soroca et al. |
| 2010/0114887 A1 | 5/2010 | Conway et al. |
| 2010/0146529 A1 | 6/2010 | Heath et al. |
| 2010/0205523 A1 | 8/2010 | Lehota et al. |
| 2010/0211906 A1 | 8/2010 | Kanai |
| 2010/0228594 A1 | 9/2010 | Chweh et al. |
| 2010/0233996 A1 | 9/2010 | Herz et al. |
| 2010/0306762 A1 | 12/2010 | Lindberg et al. |
| 2010/0318608 A1 | 12/2010 | Huang et al. |
| 2011/0016169 A1 | 1/2011 | Cahill et al. |
| 2011/0041003 A1 | 2/2011 | Pattar et al. |
| 2011/0055005 A1 | 3/2011 | Lang |
| 2011/0093900 A1 | 4/2011 | Patel et al. |
| 2011/0099558 A1 | 4/2011 | Patrick et al. |
| 2011/0099627 A1 * | 4/2011 | Proudler ............. G06F 21/57 |
| | | 726/21 |
| 2011/0119571 A1 | 5/2011 | Decker et al. |
| 2011/0138295 A1 | 6/2011 | Momchilov et al. |
| 2011/0138314 A1 | 6/2011 | Mir et al. |
| 2011/0153806 A1 | 6/2011 | Bagasra |
| 2011/0173098 A1 | 7/2011 | Lee |
| 2011/0185354 A1 | 7/2011 | Tanner et al. |
| 2011/0209047 A1 | 8/2011 | Olsen et al. |
| 2011/0225178 A1 | 9/2011 | Ingrassia |
| 2011/0231280 A1 * | 9/2011 | Farah ............................ 705/26.8 |
| 2011/0282700 A1 | 11/2011 | Cockcroft |
| 2011/0289422 A1 | 11/2011 | Spivack et al. |

(56) References Cited

U.S. PATENT DOCUMENTS

| | | |
|---|---|---|
| 2011/0302510 A1 | 12/2011 | Harrison et al. |
| 2011/0302524 A1 | 12/2011 | Forstall |
| 2011/0307738 A1 | 12/2011 | Hilerio et al. |
| 2011/0307880 A1 | 12/2011 | Hilerio et al. |
| 2011/0307883 A1 | 12/2011 | Hilerio et al. |
| 2011/0307946 A1 | 12/2011 | Hilerio et al. |
| 2011/0314389 A1 | 12/2011 | Meredith et al. |
| 2012/0005346 A1 | 1/2012 | Burckart |
| 2012/0010995 A1 | 1/2012 | Skirpa et al. |
| 2012/0021774 A1 | 1/2012 | Mehta et al. |
| 2012/0030617 A1 | 2/2012 | Louch |
| 2012/0047442 A1 | 2/2012 | Nicolaou et al. |
| 2012/0054841 A1 | 3/2012 | Schultz et al. |
| 2012/0066583 A1 | 3/2012 | Priestley et al. |
| 2012/0066634 A1 | 3/2012 | Kim et al. |
| 2012/0079126 A1 | 3/2012 | Evans et al. |
| 2012/0084292 A1 | 4/2012 | Liang et al. |
| 2012/0084713 A1 | 4/2012 | Desai et al. |
| 2012/0096396 A1 | 4/2012 | Ording et al. |
| 2012/0150963 A1 | 6/2012 | Horowitz et al. |
| 2012/0151368 A1 | 6/2012 | Tam |
| 2012/0166956 A1 | 6/2012 | Hilerio et al. |
| 2012/0166959 A1 | 6/2012 | Hilerio et al. |
| 2012/0173312 A1 | 7/2012 | Kern |
| 2012/0174075 A1 | 7/2012 | Carteri et al. |
| 2012/0179671 A1* | 7/2012 | Turner ............... G06F 17/30861 707/723 |
| 2012/0233243 A1 | 9/2012 | Ashkenazy et al. |
| 2012/0235912 A1 | 9/2012 | Laubach |
| 2012/0246291 A1 | 9/2012 | Wong et al. |
| 2012/0266186 A1 | 10/2012 | Parzygnat |
| 2012/0278127 A1 | 11/2012 | Kirakosyan et al. |
| 2012/0290919 A1 | 11/2012 | Melnyk et al. |
| 2012/0291022 A1 | 11/2012 | Mehta et al. |
| 2012/0296959 A1 | 11/2012 | Momchilov et al. |
| 2012/0297291 A1 | 11/2012 | Fainberg et al. |
| 2012/0297377 A1 | 11/2012 | Chen et al. |
| 2012/0311419 A1 | 12/2012 | Kwak et al. |
| 2012/0324338 A1 | 12/2012 | Meredith et al. |
| 2013/0024696 A1 | 1/2013 | Rudelic |
| 2013/0024763 A1 | 1/2013 | Nemati et al. |
| 2013/0024851 A1 | 1/2013 | Firman et al. |
| 2013/0073401 A1 | 3/2013 | Cook |
| 2013/0081081 A1 | 3/2013 | Wang |
| 2013/0111341 A1 | 5/2013 | Bier |
| 2013/0124211 A1 | 5/2013 | McDonough |
| 2013/0124557 A1 | 5/2013 | Goode et al. |
| 2013/0139146 A1 | 5/2013 | Bickle et al. |
| 2013/0145348 A1 | 6/2013 | Agovic et al. |
| 2013/0173319 A1 | 7/2013 | Thomas et al. |
| 2013/0191242 A1* | 7/2013 | Daniel et al. ................ 705/26.7 |
| 2013/0197972 A1 | 8/2013 | Taguchi et al. |
| 2013/0204975 A1 | 8/2013 | Keith, Jr. |
| 2013/0227646 A1 | 8/2013 | Haggerty et al. |
| 2013/0238999 A1 | 9/2013 | Helms et al. |
| 2013/0246906 A1 | 9/2013 | Hamon |
| 2013/0247030 A1 | 9/2013 | Kay et al. |
| 2013/0262168 A1 | 10/2013 | Makanawala et al. |
| 2013/0268837 A1 | 10/2013 | Braithwaite |
| 2013/0282798 A1 | 10/2013 | Mccarthy et al. |
| 2013/0290879 A1 | 10/2013 | Greisson |
| 2013/0304581 A1 | 11/2013 | Soroca et al. |
| 2013/0304608 A1 | 11/2013 | Mehta et al. |
| 2014/0019958 A1* | 1/2014 | Sherman ...................... 717/178 |
| 2014/0053107 A1 | 2/2014 | Patel |
| 2014/0068421 A1 | 3/2014 | Bourke et al. |
| 2014/0095886 A1 | 4/2014 | Futral |
| 2014/0114901 A1* | 4/2014 | Pradhan ............. G06Q 30/0631 706/50 |
| 2014/0189546 A1 | 7/2014 | Hilerio et al. |
| 2014/0236756 A1 | 8/2014 | Bourke et al. |
| 2014/0250105 A1* | 9/2014 | Shankar ................. 707/722 |
| 2014/0258845 A1 | 9/2014 | Machado et al. |
| 2014/0297516 A1* | 10/2014 | Brown ............... G06F 3/04817 705/39 |
| 2014/0325344 A1 | 10/2014 | Bourke et al. |
| 2014/0358657 A1 | 12/2014 | Smullen et al. |
| 2014/0365602 A1* | 12/2014 | Hillary et al. ................ 709/217 |
| 2014/0365962 A1* | 12/2014 | Lee et al. ...................... 715/810 |
| 2015/0020126 A1* | 1/2015 | Kegel ............... G06F 17/30029 725/87 |
| 2015/0051972 A1 | 2/2015 | Chweh et al. |
| 2015/0106801 A1* | 4/2015 | Agrawal et al. ............... 717/177 |
| 2015/0163549 A1* | 6/2015 | Suh et al. ..................... 717/168 |
| 2015/0172374 A1* | 6/2015 | Chaudhry et al. ............ 717/177 |
| 2015/0186999 A1* | 7/2015 | Wei et al. ..................... 717/173 |
| 2015/0188980 A1 | 7/2015 | Bourke |
| 2015/0331685 A1 | 11/2015 | Bourke et al. |
| 2015/0332287 A1 | 11/2015 | Arroyo et al. |
| 2016/0110066 A1 | 4/2016 | Mccormick et al. |
| 2017/0147318 A1 | 5/2017 | Bourke |
| 2017/0310784 A1 | 10/2017 | Bourke |

FOREIGN PATENT DOCUMENTS

| | | |
|---|---|---|
| WO | 9952056 A1 | 10/1999 |
| WO | 2006120280 A1 | 11/2006 |
| WO | 2011160139 A1 | 12/2011 |
| WO | 2012154501 A2 | 11/2012 |
| WO | 2013074713 A1 | 5/2013 |
| WO | 2014130875 A1 | 8/2014 |
| WO | 2015103233 A1 | 7/2015 |

OTHER PUBLICATIONS

International Search Report and Written Opinion for International Application No. PCT/US2009/36069, date completed Jun. 23, 2009, dated Jul. 7, 2009, 8 pgs.

International Search Report and Written Opinion for International Application No. PCT/US2012/65136, International Filing Date Nov. 14, 2012, Search Completed Jan. 29, 2013, dated Feb. 8, 2013, 7 pgs.

International Search Report and Written Opinion for International Application No. PCT/US2013/052562, International Filing Date Jul. 29, 2013, Search Completed Jan. 30, 2014, dated Feb. 7, 2014, 5 pgs.

International Search Report and Written Opinion for International Application No. PCT/US2013/052861, International Filing Date Jul. 31, 2013, Search Completed Jan. 29, 2014, dated Feb. 21, 2014, 8 pgs.

International Search Report and Written Opinion for International Application No. PCT/US2013/057087, International Filing Date Aug. 28, 2013, Search Completed Feb. 27, 2014, dated Mar. 19, 2014, 11 pgs.

International Search Report and Written Opinion for International Application PCT/US2011/041129, Report completed Sep. 22, 2011; 15 pgs.

Extended European Search Report for European Application EP09718357.8, report completed Oct 2, 2014 dated Oct 10, 2014, 5 Pgs.

"How to Use the Remote Shutdown Tool to Shut Down and Restart a computer in Windows 2000, published Jul. 5, 2006, ppp. 1-2", printed from http://support.microsoft.com/kb/317371.

Heino et al., "Developing Semantic Web Applications with the OntoWiki Framework", Springer 2009, pp. 61-77.

Laufer, "A Hike through Post-EJB J2EE Web Application Architecture", IEEE, 2005, 80-88.

Lee et al., "Integrating Service Composition Flow with User Interactions", IEEE, 2008, 103-108.

Mikkonen et al., "Towards a Uniform Web Application Platform for Desktop Computers and Mobile Devices", ACM, 2008, pp. 1-29.

Oren, "SemperWiki: A Semantic Personal Wiki", Google 2005, pp. 1-16.

Stearn, "XULRunner: A New Approach for Developing Rich Internet Applications", IEEE, 2007, pp. 67-73.

Sugawara et al., "A Novel Intuitive GUI Method for User-friendly Operation", Knowledge-Based Systems, ScienceDirect, 2009, 235-246.

(56) References Cited

OTHER PUBLICATIONS

Extended European Search Report for European Application No. 13847844.1, Search completed Nov. 15, 2016, dated Nov. 24, 2016, 8 pgs.
Extended European Search Report for European Application No. 14754141A, Search completed Aug. 9, 2016, dated Aug. 18, 2016, 8 pgs.
Extended European Search Report for European Application No. 14876001.0, Search completed Apr. 21, 201, dated May 5, 2017, 11 pgs.
International Preliminary Report on Patentability for International Application PCT/US14/17806, Report Issued Aug. 25, 2015, dated Sep. 3, 2015, 4 pgs.
International Preliminary Report on Patentability for International Application PCT/US2013/052042, Report Issued Feb. 10, 2015, dated Feb. 19, 2015, 10 pgs.
International Preliminary Report on Patentability for International Application PCT/US2013/052562, Report Issued Mar. 3, 2015, dated Mar. 12, 2015, 4 pgs.
International Preliminary Report on Patentability for International Application PCT/US2013/052861, Report Issued Apr. 21, 2015, dated Apr. 30, 2015, 7 pgs.
International Preliminary Report on Patentability for International Application PCT/US2013/057087, Report Issued Mar. 3, 2015, dated Mar. 12 2015, 10 pgs.
International Search Report and Written Opinion for International Application No. PCT/US13/52042, International Filing Date Jul. 25, 2013, Search Completed Dec. 13, 2013, dated Dec. 23, 2013, 12 pgs.
International Search Report and Written Opinion for International Application PCT/US2014/072707, Report Completed Apr. 9, 2015, dated Apr. 24, 2015, 5 pgs.
International Search Report and Written Opinion for International Application PCT/US14/17806, report completed May 28, 2014, dated Jun. 17, 2014, 5 pgs.
Davidyuk et al., "Context-Aware Middleware for Mobile Multimedia Applications", ACM 2004, pp. 213-220.
Pokki, Download Free Desktop Apps and games, available at http://web.archive.org/web/20150105201753/https://www.pokki.com/., Jan. 15, 2013, 3 pgs.
Sen et al., "Feed Me: A Collaboration Alert Filtering System," ACM 2006, 11 pgs.

* cited by examiner

SYSTEMS AND METHODS FOR APPLICATION INSTALLATION PLATFORMS

CROSS-REFERENCE TO RELATED APPLICATIONS

The instant application claims priority to U.S. Provisional Patent Application No. 61/994,033, filed May 15, 2014, the disclosure of which is hereby incorporated by reference in its entirety.

FIELD OF THE INVENTION

The present invention is generally related to applications and more specifically to applications that manage and install application on a computing device.

BACKGROUND

An application store is a type of digital distribution platform for software, often provided as a component of an operating system on a personal computer or mobile device. Application stores typically take the form of an online store, where users can browse through different categories and genres of applications and automatically download and install the application on their device. Some application stores may also include a system to automatically remove an installed program from devices under certain conditions, such as to protect the user against a malicious program. A variety of application stores exist, such as the Google Play service provided by Google, Inc. of Mountain View, Calif. and the App Store provided by Apple, Inc. of Cupertino, Calif.

SUMMARY OF THE INVENTION

Systems and methods for providing an application marketplace configured to install applications outside of an application store provided by the entity providing the operating system of a computing device in accordance with embodiments of the invention are illustrated. In one embodiment, a computing device includes a processor and a memory connected to the processor and storing an application installation application, wherein the application installation application directs the processor to obtain target information including data descriptive of the computing device, transmit a request for a set of recommended applications, where the request includes the target information, obtain recommended application data identifying at least one installation package targeted to the computing device based on the target information, and install the recommended application data on the computing device.

In an additional embodiment, the recommended application data is signed using an OEM key.

DETAILED DESCRIPTION

Turning now to the drawings, systems and methods for application installation platforms in accordance with embodiments of the invention are illustrated. A major problem facing OEM computing device providers is that the OEM's struggle to monetize and differentiate devices through applications provided on the computing devices. The OEMs do not have access to the same class of solutions that developers do—for example, there are no advertising platforms to help OEMs monetize applications or performance metric measuring platforms to provide OEMs analytics of the applications. Therefore, OEMs are forced to hard bundle applications on devices in order to make up for low margins and stand out in a crowded space. For example, OEMs preload many (up to 40 or more) applications on their computing devices. They do so to differentiate their products and of course, to boost margins, as application developers pay to be preloaded. However, the current method of manually bundling applications is completely broken. It is not ideal for OEMs, it does not work for the application developers, and users hate it. In fact, a recent study of users showed that they completely ignore the company's pre-bundled software offerings, which means it is not working for any of the stakeholders. The preloading application model is broken for several reasons, including an inability to segment different applications for different SKUs in different geographies, languages, and channels. In other words, no ability to try to deliver the right applications by device type, device mode (tablet or PC mode), customer segment (SMB vs. gamer), timing (tax application during tax season), etc. Instead, it is a spray-and-pray approach. Today, OEMs manually manage and deploy a master software image onto all their devices during the manufacturing process, which is why they have to stuff so many applications onto each image. Additionally, there is no way to recommend applications on an ongoing basis. Today, they have one shot to get you to use one of the generic applications they preloaded 6 months ago. Furthermore, a limited number of application partnerships they can do. Today, OEMs do a handful of big global application deals with the top 0.1% of application providers because of their inability to segment, as well as the inability to recommend applications over the lifetime of the device. They cannot work with the 99.9% of developers who would kill to be promoted on new devices to the right users. They cannot promote a hot game the day it comes out. They cannot promote a tax application during tax season. Moreover, a lack of analytics to know what users like and what they do not. Today, OEMs know when their devices leave the factory and get some reports back from the retail distribution chain but do not have insights into their devices, the applications on their devices, and the customers of their devices to help them make better decisions.

Application Installation Platforms

Figure 1:
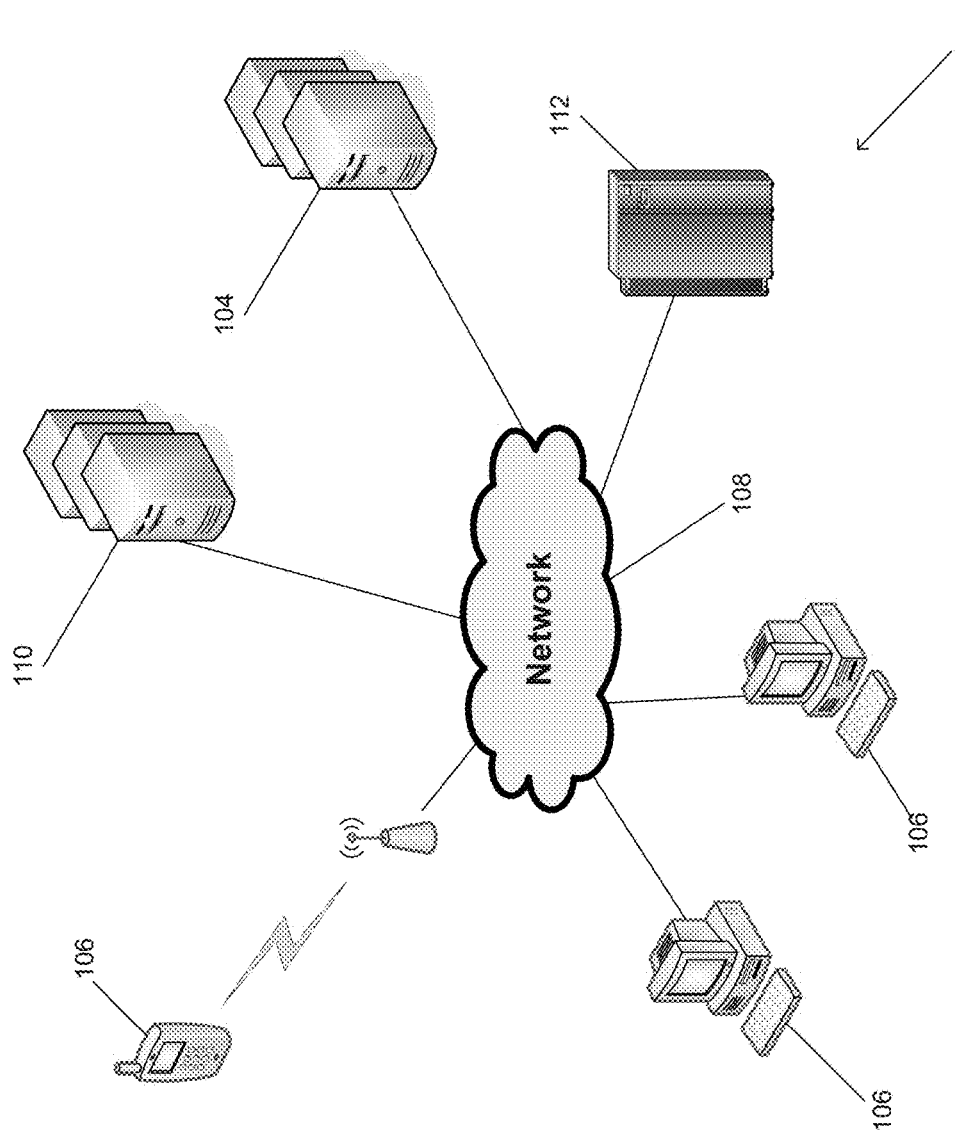
FIG. 1 is a network diagram illustrating an application installation platform in accordance with an embodiment of the invention.

Application installation platforms in accordance with embodiments of the invention are designed to combat and solve the problems associated with preloading applications on computing devices. The application installation platform provides OEMs a way to improve the user satisfaction as well as the differentiation and monetization of their devices. In a variety of embodiments, application installation platforms include an ad server that gives OEMs ability to control, track and manage applications delivered to computing devices in real-time, an ad network that powers contextually relevant application install recommendations, an analytics console that offers performance metrics and insight into applications and their devices, and white-label touchpoints installed on computing devices to plug application install ads and present those advertisements to users. Turning now to FIG. 1, an application install platform in accordance with an embodiment of the invention is conceptually illustrated. The application installation platform 100 includes computing devices 106 connected to an advertising server 110, an OEM application provider 104, and an officially sanctioned marketplace 112. Computing devices 106 include, but are not limited to, personal computers, tablets, mobile phones, and any other computing device capable of installing and executing software applications. Mobile phones include, but are not limited to, devices running iOS provided by Apple, Inc., Android provided by Google, Inc., and Windows Phone OS provided by Microsoft, Inc. of Redmond, Wash. The network 108 is any of a variety of networks that provide connectivity between the different systems within the application installation platform 100, including but not limited to the Internet. In this way, the application installation platform provides cloud-based services that provide OEMs application install capabilities they have never had before in their manually bundled images. The advertising server 110 can configure, control and optimize the applications that are promoted in any customer-facing touchpoint, in real-time managed through a secure, web-based console. This reduces the costs, complexities, and inefficiencies behind the old preload model. Additionally, applications can be targeted to particular segments and distribution on SKUs by variables such as geography, language, device type, device mode, customer segment, and timing. Advertising server 110 deploys applications from a dynamic cloud-based solution rather than manually bundling applications during manufacturing and promotes applications through engaging white-label interfaces not only at first boot, but also throughout the lifetime of the device. Additionally, the advertising server 110 provides a marketplace of applications from application developers vying to be promoted on a variety of computing devices.

In a variety of embodiments, the computing devices 106, advertising server 110, OEM application provider 104, and/or officially sanctioned marketplace 112 provides a user interface allowing for visualizing and interacting with the data. In several embodiments, the computing devices 106, advertising server 110, OEM application provider 104, and/or officially sanctioned marketplace 112 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture for an application installation platform 100 in accordance with an embodiment of the invention is conceptually illustrated in FIG. 1, any of a variety of architectures, including those that store data or applications on disk or some other form of storage and are loaded into memory at runtime, can also be utilized. Additionally, any of the data utilized within the system can be cached and transmitted once a network connection (such as a wireless network connection via a communications interface) becomes available. In a variety of embodiments, the devices described above include a memory including circuitry such as, but not limited to, memory cells constructed using transistors, that are configured to store instructions. Similarly, the devices described above can include a processor including logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Figure 2:
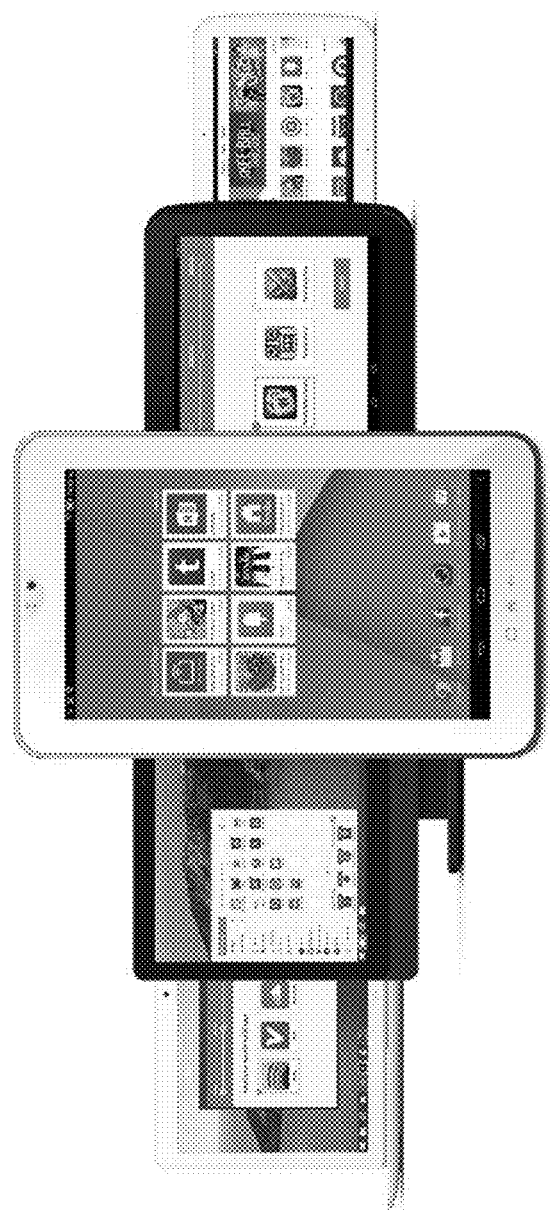
FIG. 2 is a conceptual rendering of an application installation platform executing on a variety of computing devices in accordance with an embodiment of the invention.

Turning now to FIG. 2, an application installation platform application executing on a plurality of computing devices in accordance with an embodiment of the invention is conceptually illustrated. The application installation platform application includes an online console that allows OEMs to, asynchronously and/or in real-time, customize, optimize, and track the applications that are delivered and installed on any specific computing device, both at the out-of-box experience and then throughout the lifetime of the device.

Figure 3:
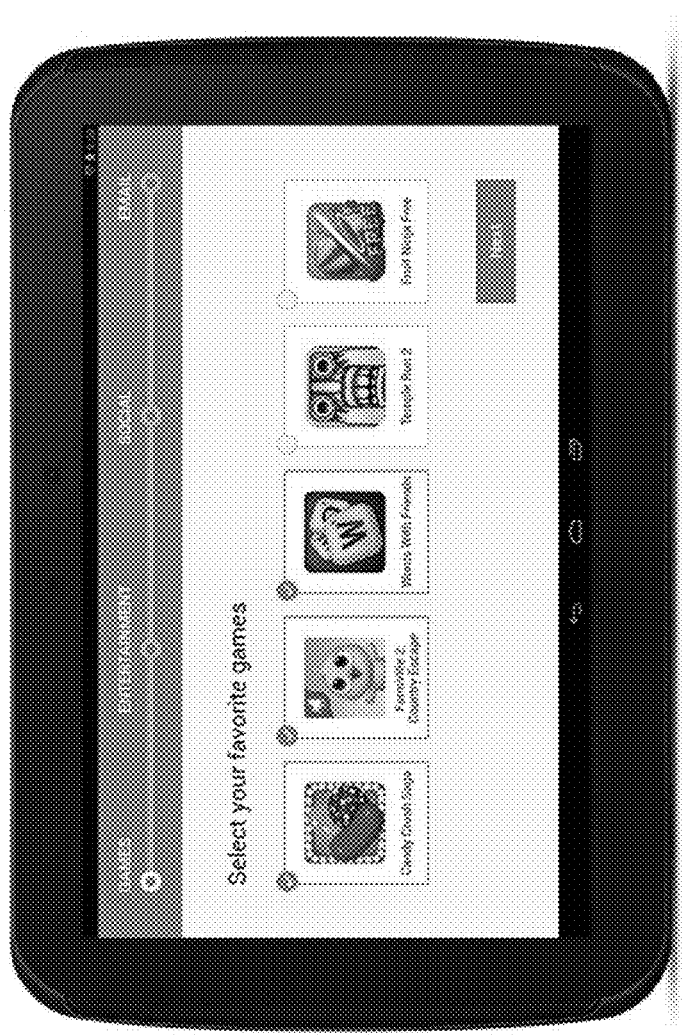
FIG. 3 is a conceptual rendering of an interface for managing applications across a variety of computing devices using an application installation platform in accordance with an embodiment of the invention.

Turning now to FIG. 3, an application installation platform application executing on a tablet pc is conceptually illustrated. In a variety of embodiment, the OEM can select a specific device type, model number, serial number, or however they wish to segment their computing devices. In many embodiments, the OEM can also determine desired countries and/or languages. The application platform installation application can be further configured with respect to the applications that appear when a device first powers on, e.g. a dynamic preload of applications. In a number of embodiments, the applications that appear are an available catalog of applications based on the filtering options set by the OEM. These applications can come from a variety of sources, such as the OEM's catalog of deals they have done with developers and/or applications provided through the application installation platform. For example, tax-related applications can be promoted during tax season. Without the application installation platform, OEMs would have to hard-bundle a generic collection of applications 6+ months in advance during the manufacturing process. The application installation platform allows the OEMS to dynamically control their preinstalled content and dramatically reduce the time, cost, while also increasing the flexibility in loading applications on the computing devices. This fundamentally change the way OEMs can deliver content on their devices, but also ends up in a better user experience as more timely and relevant applications can be delivered to the right users.

Figure 4:
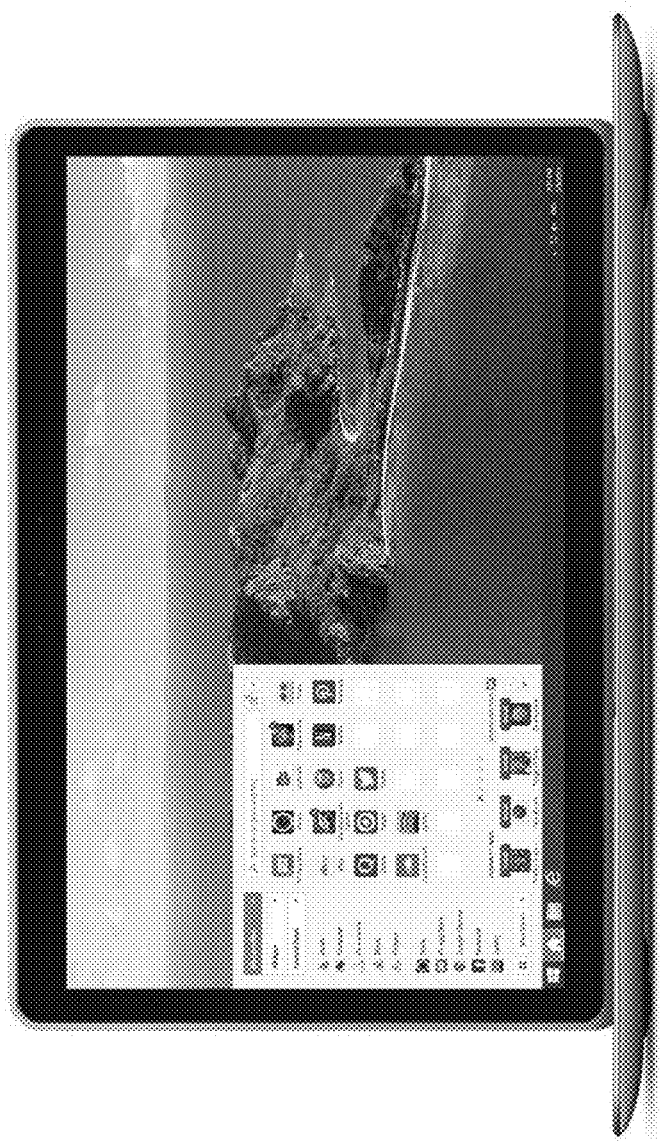
FIG. 4 is a conceptual rendering of an alternative interface for managing applications across a variety of computing devices using an application installation platform in accordance with an embodiment of the invention.

Additionally, the application installation platform provides OEMs a way to complement or even replace the preload model by dynamically offering applications during first boot as well as over the lifetime of the device. The application installation platform can provide a variety of techniques to present touchpoints to the users to browse and install applications, such as consumer-facing touchpoints and/or a SDK to plug into any consumer-facing touchpoint that can display application install ads, including white-label widgets and even other applications like launchers. OEMs can use our touchpoints, their own touchpoints, or, in the future, even plug into 3rd party touchpoints from developers. A variety of categories of applications can be presented to the user. A large portion of application installs happen on brand new devices. This opens up an opportunity for the OEMs to capitalize on this initial application install burst by recommending the right applications for a new device. Application platform applications can recommend applications over the lifetime of the device. Turning now to FIG. 4, an application installation platform application executing on a personal computer is conceptually illustrated. In the illustrated embodiment, the illustrated computing device has a variety of applications previously installed using an application installation platform application.

Figure 5:
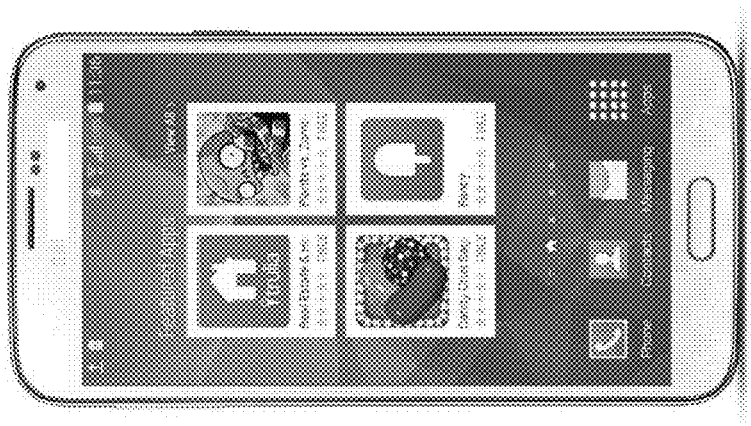
FIG. 5 is a conceptual rendering of an interface for measuring and viewing performance metrics for one or more applications distributed using an application installation platform in accordance with an embodiment of the invention.

The application installation platform optimizes the applications that ultimately appear in the widget. This optimization can be based on those applications that resonate with users, device characteristics (e.g. device form factor, model, specs), user characteristics (e.g. geography, language, time), and/or (anonymous) application install behavior. Based on the optimizations, applications can be targeted and delivery of those applications can be improved. For example, if we know that a computing device has at 10-inch screen, is located in the US, and is being used in landscape mode at 9 pm, the application installation platform can recommend entertainment applications like Netflix as the recorded performance data indicates that applications utilized to consume video content have a high degree of user engagement in those conditions. With more targeted and relevant application install ads, user satisfaction, and thus conversion improves and OEMs make more money utilizing the application installation platform. Turning now to FIG. 5, a example of an application platform application presenting application recommendations to a user of a computing device that have been optimized based on recorded application performance metrics in accordance with an embodiment of the invention is conceptually illustrated.

Figure 6:
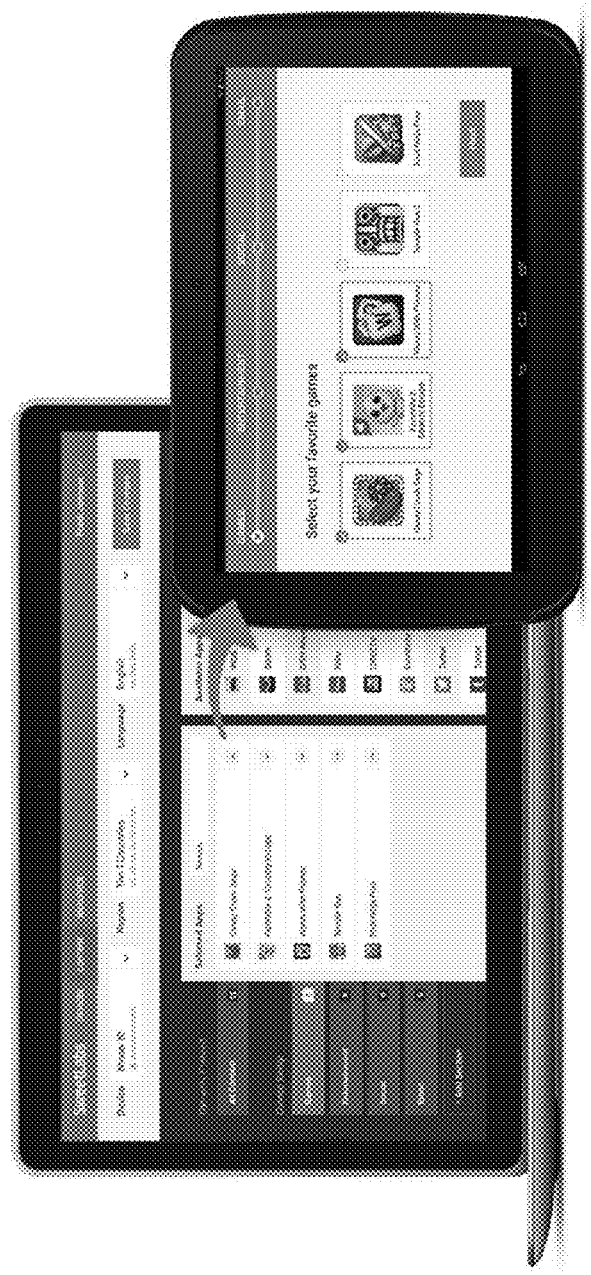
FIG. 6 is a conceptual rendering of a presentation of applications that can be installed via an application installation platform for a particular computing device in accordance with an embodiment of the invention.
Figure 7:
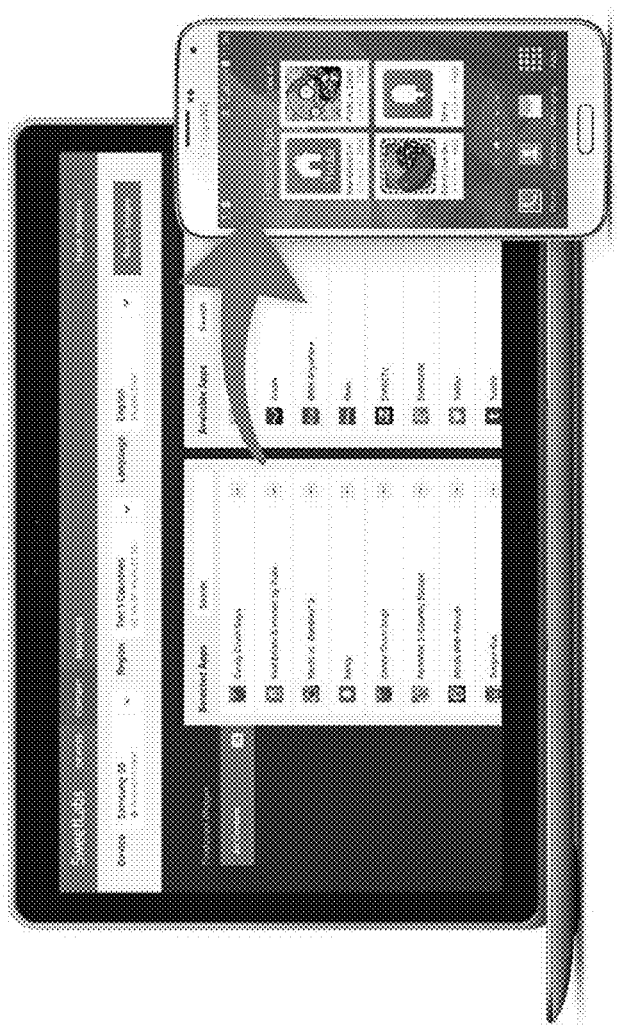
FIG. 7 is a conceptual rendering of a presentation of applications that can be installed via an application installation platform based on applications installed on a particular computing device in accordance with an embodiment of the invention.

In a variety of embodiments, application installations can be managed and coordinated across a variety of computing devices. In this way, the application installation platform can identify the appropriate version of an application for each computing device so that the user experience is optimized based on the properties of each particular computing device. Turning now to FIG. 6, an application installed on a personal computer being additionally installed on a tablet pc in accordance with an embodiment of the invention is conceptually illustrated. Additionally, applications that a user has expressed an interest in can be automatically distributed to all of a particular user's computing devices, providing the user with a unified experience across devices. Turning to FIG. 7, the management of applications installed on a mobile phone being controlled by a listing of applications installed on a personal computer in accordance with an embodiment of the invention is conceptually illustrated. In this way, application installation platform applications promote applications through multiple customer-facing touchpoints, including white-label applications and widgets that integrate into the out-of-box experience as well throughout the lifetime of a device.

Figure 8:
FIG. 8 is a conceptual rendering of application recommendations that can be installed via an application installation platform in accordance with an embodiment of the invention.

With the right data, insight and intelligence, application installation platforms can optimize the delivery of applications to the right users on the right devices by measuring application and computing device performance metrics down to the specific device SKU. As described above, application installation platforms track and provide access to a variety of metrics associated with the presentation, installation, and/or usage of applications. In a number of embodiments, the application installation platform provides a reporting console that displays real-time analytics to help measure and report on application install ad performance, application usage, and computing device insights. Turning now to FIG. 8, an analytics interface displaying a variety of usage metrics recorded during the presentation, installation, and usage of applications within the application installation platform in accordance with an embodiment of the invention is conceptually illustrated. The analytics interface can provide a feedback loop so that OEMs can learn and make informed decisions about their business and customers. In several embodiments, application analytics provide data regarding what applications resonate most with your customers, what content to preload and recommend on which devices, and how computing device characteristics influences application engagement. In many embodiments, device analytics track end-to-end channel metrics to provide data regarding when and where computing devices are activated along with measuring performance of marketing programs, retailer performance, and any other metrics.

Recommending and Installing Applications

Figure 9:
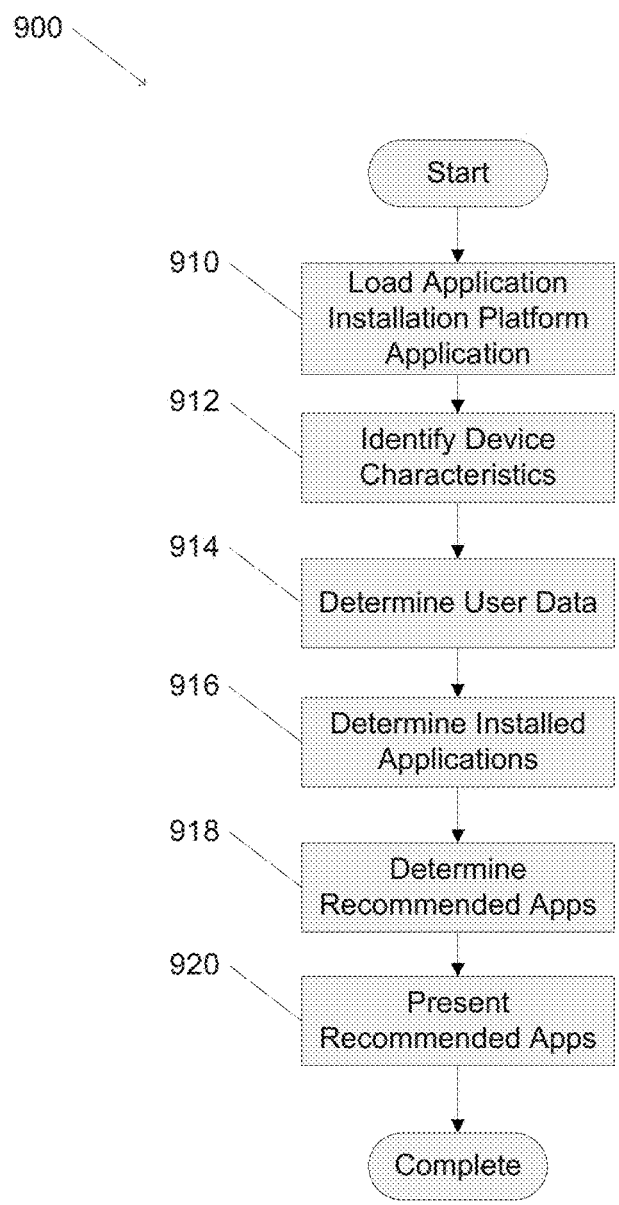
FIG. 9 is a flowchart illustrating a process for presenting application recommendations in accordance with an embodiment of the invention.

Turning now to FIG. 9, a process for presenting applications via an application installation platform in accordance with an embodiment of the invention is illustrated. The process 900 includes loading (910) the application installation platform application on one or more computing devices. Computing device characteristics are identified (912), user data is determined (914), and/or installed applications are determined (916). As described above, user data can include any demographic information related to the user of a computing device, computing device characteristics include any properties of the hardware and/or software included in the computing device, and installed applications include any applications installed on the computing device, including applications installed via the application installation platform or outside of the application installation platform. Any other data can be utilized as appropriate to the requirements of specific applications of embodiments of the invention. Recommended applications are determined (918) and presented (920) on the computing device.

Figure 10:
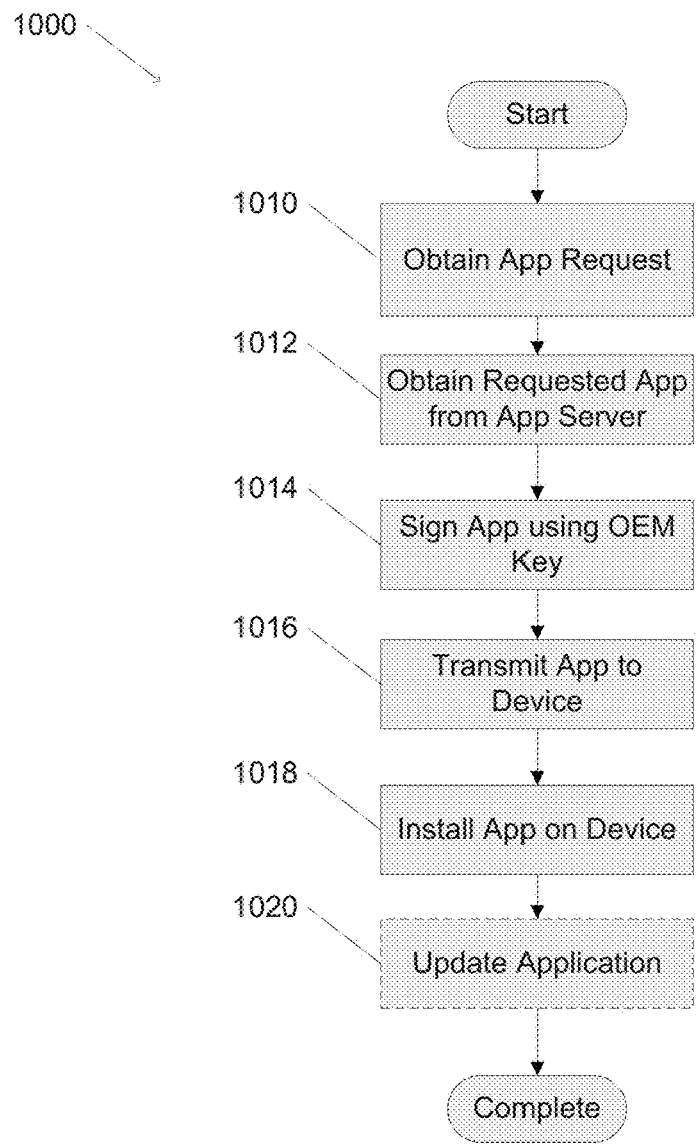
FIG. 10 is a flowchart illustrating a process for installing and updating applications provided via an application installation platform in accordance with an embodiment of the invention.

Once one or more applications have been identified to install on a computing device, the applications must then be actually installed. In many embodiments, computing devices do not allow for applications to be installed outside of an officially sanctioned marketplace provided by the entity providing the operating system of the computing device. In several embodiments, applications can be installed outside of the officially sanctioned marketplace only if the user takes several steps to disable security measures in place to prevent such installations; these steps are often cumbersome and outside the abilities of the average computing device user. Application installation platforms in accordance with embodiments of the invention utilize OEM-specific installation keys, often times provided by the entity providing the operating system of the computing device, that allow applications to be installed outside of the sanctioned marketplace. This allows users to seamlessly install applications using the application installation platform application. Additionally, in a variety of embodiments, the installed applications can be automatically maintained and updated using the officially sanctioned marketplace. Turning now to FIG. 10, a process for installing and updating an application using an application installation platform in accordance with an embodiment of the invention is illustrated. The process 1000 includes obtaining (1010) an application request and obtaining (1012) the requested application from an application server. The application server can be hosted by the OEM and/or a third-party. The requested application is signed (1014) using the OEM's key and the signed application is transmitted (1016) to a computing device. The application is installed (1018) on the computing device and, in a number of embodiments, the application is updated (1020). As described above, this update can be performed using the application installation platform and/or a using a third-party service, such as an officially sanctioned marketplace.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system, comprising:
   a processor; and
   a memory readable by the processor and storing instructions;
   wherein the instructions, when read by the processor, directs the processor to:
   obtain device data from a computing device, wherein the device data identifies the computing device and comprises metadata describing the characteristics of the computing device;
   determine recommended OEM-provided (Original Equipment Manufacturer) application data based on the obtained device data; wherein the recommended OEM-provided application data comprises metadata describing at least one OEM-provided application;
   present recommended OEM-provided application data to the computing device;
   obtain selected OEM-provided application data from the computing device;
   sign OEM-provided application data identified by the selected OEM-provided application data using OEM key data after obtaining the selected OEM-provided application data from the computing device; and
   provide the signed OEM-provided application data to the computing device; and
   wherein the signed OEM-provided application data is utilized to install applications tailored to the computing device to dynamically pre-load the OEM-provided signed application data on the computing device.

2. The system of claim 1, wherein the metadata describing the characteristics of the computing device describes characteristics selected from the group consisting of demographic information related to the user of the computing device, the hardware capabilities of the computing device, operating system software installed on the computing device, and applications installed on the computing device.

3. The system of claim 1, wherein the recommended OEM-provided application data directs the computing device to generate at least one touchpoint for browsing the recommended OEM-provided application data.

4. The system of claim 3, wherein at least one of the at least one generated touchpoints comprises advertising data.

5. The system of claim 4, wherein the advertising data is provided by a third-party advertising server system.

6. The system of claim 1, wherein:
   the device data further comprises a timestamp identifying when the device data was provided; and
   the instructions further direct the processor to optimize the recommended OEM-provided application data based on the timestamp.

7. The system of claim 1, wherein the instructions further direct the processor to generate analytics data based on the obtained device data, the recommended OEM-provided application data, the selected OEM-provided application data, and the signed OEM-provided application data.

8. The system of claim 7, wherein the instructions further direct the processor to provide an interface for displaying the generated analytics data.

\* \* \* \* \*